US012658632B2

(12) United States Patent
Knoedler et al.

(10) Patent No.: US 12,658,632 B2
(45) Date of Patent: Jun. 16, 2026

(54) CONNECTOR WITH A CONNECTED MULTI-CORE CABLE, A CONNECTOR HOUSING AND CONTACT ELEMENTS

(71) Applicant: Kromberg & Schubert Automotive GmbH & Co. KG, Renningen (DE)

(72) Inventors: Michael Knoedler, Leinfelden-Echterdingen (DE); Markus Polt, Leonberg (DE)

(73) Assignee: Kromberg & Schubert Automotive GmbH & Co. KG, Renningen (DE)

( * ) Notice: Subject to any disclaimer, the term of this patent is extended or adjusted under 35 U.S.C. 154(b) by 292 days.

(21) Appl. No.: 18/453,563

(22) Filed: Aug. 22, 2023

(65) Prior Publication Data

US 2024/0072484 A1 Feb. 29, 2024

(30) Foreign Application Priority Data

Aug. 26, 2022 (DE) ..................... 10 2022 121 693.4

(51) Int. Cl.
*H01R 13/52* (2006.01)
*H01R 13/22* (2006.01)
*H01R 13/631* (2006.01)

(52) U.S. Cl.
CPC ......... *H01R 13/5205* (2013.01); *H01R 13/22* (2013.01); *H01R 13/631* (2013.01)

(58) Field of Classification Search
CPC .. H01R 13/5205; H01R 13/22; H01R 13/631; H01R 43/005; H01R 43/20;
(Continued)

(56) References Cited

U.S. PATENT DOCUMENTS 11,309,656 B2 * 4/2022 Winkelmann ..... H01R 13/5208
2020/0021057 A1 * 1/2020 Yi ...................... H01R 13/6272
(Continued)

FOREIGN PATENT DOCUMENTS

DE 29519589 U1 4/1997
DE 202012004919 U1 * 6/2012 ......... H01R 13/5208
DE 112013007546 T5 7/2016

OTHER PUBLICATIONS

German Examination Report dated Apr. 27, 2023 in corresponding German Application No. 10 2022 121 693.4.

*Primary Examiner* — Abdullah A Riyami
*Assistant Examiner* — Nader J Alhawamdeh
(74) *Attorney, Agent, or Firm* — Harness, Dickey & Pierce, P.L.C.

(57) ABSTRACT

A connector (1) with a connected multi-core cable (2), a connector housing (3) and contact elements (4). The multi-core cable (2) has at least two individual cores (21) surrounded by a cable sheath (22). A receiving space (31) is formed in the connector housing (3) at a longitudinal end. The individual cores (21) are introduced into the connector housing (3) through the receiving space (31) and then run through a cable guide portion (32). The contact elements (4) are abutted against a respective end of the individual cores (21) at the end of the cable guide portion (32) and are mounted in a contact chamber (33) of the connector housing (3) with a floating clearance. A sealing element (6) is arranged in the receiving space (31) and the sealing element (6) abuts against a stop (311) of the receiving space (31). The respective individual core (21) is guided in the cable guide portion (32) between the sealing element (6) and the contact element (4) with a lateral clearance and/or a bearing gap (321) to the inner wall of the cable guide portion (32) so that the bearing clearance of the corresponding contact element
(Continued)

(4) is realized. A method of assembling a connector (1) with a multi-core cable (2).

12 Claims, 3 Drawing Sheets

(58) Field of Classification Search
CPC H01R 13/5208; H01R 13/40; H01R 13/5202; H01B 7/17
See application file for complete search history.

(56) References Cited

U.S. PATENT DOCUMENTS

2021/0143572 A1* 5/2021 Winkelmann ..... H01R 13/5208
2024/0072484 A1* 2/2024 Knoedler ............ H01R 43/005

* cited by examiner

CONNECTOR WITH A CONNECTED MULTI-CORE CABLE, A CONNECTOR HOUSING AND CONTACT ELEMENTS

CROSS-REFERENCE TO RELATED APPLICATION

This application claims the benefit and priority of German Application No. 10 2022 121 693.4, filed Aug. 26, 2022. The entire disclosure of the above application is incorporated herein by reference.

FIELD

The disclosure relates to a connector with a connected multi-core cable, a connector housing and contact elements. The disclosure further relates to a method of assembling a connector with a multi-core cable.

BACKGROUND

When connectorizing connectors with a connected multi-core cable, a seal against ingress of moisture, dirt or overmolding material must be ensured. For this purpose, the individual cores must be reliably sealed. However, utilizing a seal against water and overmolding material is associated with a conflicting objective which is usually solved by using multiple components.

As such, maintaining a contact clearance of the contact elements in the connector housing is of no importance in the prior art. If, in the known solutions, the clearance of the contact element is restricted, when paired with the interface, this can lead to constrained positions which can result in premature failure of the connector system, e.g., due to increased friction corrosion.

Therefore, an object of the present disclosure is to provide a connector with a connected multi-core cable, which implements a bearing clearance of the contact elements in the connector housing and at the same time ensures a seal against ingress of moisture, dirt or plastic material into the connector housing.

SUMMARY

This object is achieved by the combination of features according to claim 1.

According to the disclosure, a connector with a connected multi-core cable, a connector housing and contact elements is proposed. The multi-core cable has at least two individual cores surrounded by a cable sheath. A receiving space is formed in the connector housing at a longitudinal end, and the individual cores are introduced into the connector housing through the receiving space and then run through a cable guide portion. As such, the contact elements are abutted against a respective end of the individual cores at the end of the cable guide portion and are mounted in a contact chamber of the connector housing with a floating clearance. Moreover, a sealing element is arranged in the receiving space and the sealing element abuts against a stop of the receiving space. Further, the respective individual core is guided in the cable guide portion between the sealing element and the contact element with a lateral clearance and/or a bearing gap to the inner wall of the cable guide portion, thus realizing the bearing clearance of the corresponding contact element.

The advantage thereof is that, due to the sealing element pushed onto the individual cables and abutting against a defined stop after having been inserted into the connector housing, a defined clearance of the contacts on the cables is maintained after assembly. The sealing element, which is pushed against a fixed, defined stop during insertion and abuts against the same in a defined manner, ensures that, in the assembled state, a previously set clearance of the cables and thus also of the contacts is maintained.

Such a design of the stop also ensures that the sealing element is not displaced along the cable by the injection pressure during a potential later overmolding of the system. As such, the sealing element is further configured to alone ensure longitudinal watertightness of the system.

Furthermore, the sealing element could be designed such that all the cables of the system are passed therethrough (collective seal).

By guiding the respective individual core in the cable guide portion between the sealing element and the contact element with a lateral clearance and/or a bearing gap to the inner wall of the cable guide portion, it is ensured that a clearance preset by design specifications of the contact chamber and the contacts is maintained.

In an advantageous embodiment variant, it is provided that a sealing sheath is further provided, which extends at least from the longitudinal end and/or from the receiving space to the cable sheath. This improves a seal against ingress of moisture, dirt or overmolding material.

Preferably, the connector is designed such that a length of the respective individual core in the cable guide portion corresponds to at least about 80% of the contact length in the contact chamber (33), preferably 80% to 300%, more preferably 80% to 150%. This ensures that the respective individual core provides sufficient flexibility for the clearance of the individual core or of the corresponding contact element in the connector housing.

In an exemplary embodiment of the disclosure, it is provided that the respective individual core is passed individually through the sealing element, in particular through a sealing recess. The advantage thereof is that the sealing of the connector housing and between the corresponding individual core is optimized. The design of the sealing element depends on the particular application and in particular on the number of cables, the cable diameter and the pitch.

Further, an embodiment is favorable in which the sealing element has at least two ribs, in particular running along the entire circumference, which extend in particular in a transverse direction of the connector. In an advantageous exemplary embodiment, the ribs are arranged in an edge region of the sealing element. As such, it is favorable that the ribs first of all compensate for an oversized receiving space of the connector housing. Moreover, the ribs improve the sealing against overmolding and longitudinal watertightness before and after overmolding.

In a further advantageous variant, it is provided according to the disclosure that the sealing element has a projection at a respective inlet and an outlet for the corresponding individual cores. The projection enables the sealing element to be supplied in an oriented manner during the production process. Furthermore, the sealing element can be coded for the respective suitable cable cross-section via different embodiments of the projections in order to avoid misallocation. The geometry may be retrieved during supply in the assembly process.

In an embodiment variant, the connector according to the disclosure is designed such that a diameter of a base body of the sealing element is constant in a longitudinal direction of the connector. In a preferred exemplary embodiment, the sealing element is designed to be substantially cuboidal.

In an embodiment variant, it is provided that the multi-core cable is a sheathed cable or a cable with individual cores and a cable sheath, in particular a hose or pipe, further in particular made of polyurethane (PUR), arranged movably around the individual cores.

According to the disclosure, a method of assembling a connector with a multi-core cable, in particular according to the above disclosure, is further disclosed, which first comprises assembling a sealing element to individual cores of the multi-core cable. Subsequently, contact elements are abutted against a respective end of the individual cores and then the contact elements as well as the individual cores are introduced into a receiving space of a connector housing of the connector until the sealing element abuts against a stop of the receiving space and the individual cores run through a cable guide portion and the contact elements are mounted in a contact chamber of the connector housing with a floating clearance. As such, the respective individual core is guided in the cable guide portion between the sealing element and the contact element with a lateral clearance and/or a bearing gap to the inner wall of the cable guide portion, thus realizing the bearing clearance of the corresponding contact element.

The advantage thereof is that, due to the sealing element pushed onto the individual cables and abutting against a defined stop after having been introduced into the connector housing, a defined clearance of the contacts on the cables is obtained after assembly. The sealing element, which is pushed against a fixed, defined stop during insertion and abuts the same in a defined manner, ensures that in the installed state a previously set clearance of the cables and thus also of the contacts is realized. Such a design of the stop also ensures that the sealing element is not displaced along the cable by the injection pressure during a potential later overmolding of the system.

As such, the sealing element is further configured to alone ensure longitudinal watertightness of the system.

By guiding the respective individual core in the cable guide portion between the sealing element and the contact element with a lateral clearance and/or a bearing gap to the inner wall of the cable guide portion, it is ensured that a clearance preset by design specifications of the contact chamber and the contacts is maintained.

In an advantageous embodiment variant, during assembly, the respective individual core is passed individually through the sealing element, in particular through a sealing recess of the sealing element. In this way, the sealing of the connector housing and between the corresponding individual cores is optimized.

In a further advantageous variant, it is provided according to the disclosure that, after introduction, the connector housing and the multi-core cable are overmolded with a sealing sheath at least in a region from the receiving space to a cable sheath of the multi-core cable. This improves a seal against ingress of moisture, dirt or overmolding material.

It is further advantageous if the multi-core cable is at least partially untwisted and/or stripped and/or straightened before assembling the sealing element. In this way, the individual cores are optimally prepared for assembly of the sealing element.

In a preferred embodiment of the disclosure, the assembly of the connector with the multi-core cable is carried out automatically by means of a handling unit. As such, it is favorable that the entire assembly method is performed in an automated manner and thus productivity is increased.

The features disclosed above can be used in any combination, as far as this is technically feasible and they do not contradict each other.

Further areas of applicability will become apparent from the description provided herein. The description and specific examples in this summary are intended for purposes of illustration only and are not intended to limit the scope of the present disclosure.

BRIEF DESCRIPTION OF DRAWINGS

Other advantageous developments of the disclosure are illustrated in the dependent claims or are described in more detail below together with the description of the preferred embodiment of the disclosure with reference to the figures.

DETAILED DESCRIPTION

Figure 1A:
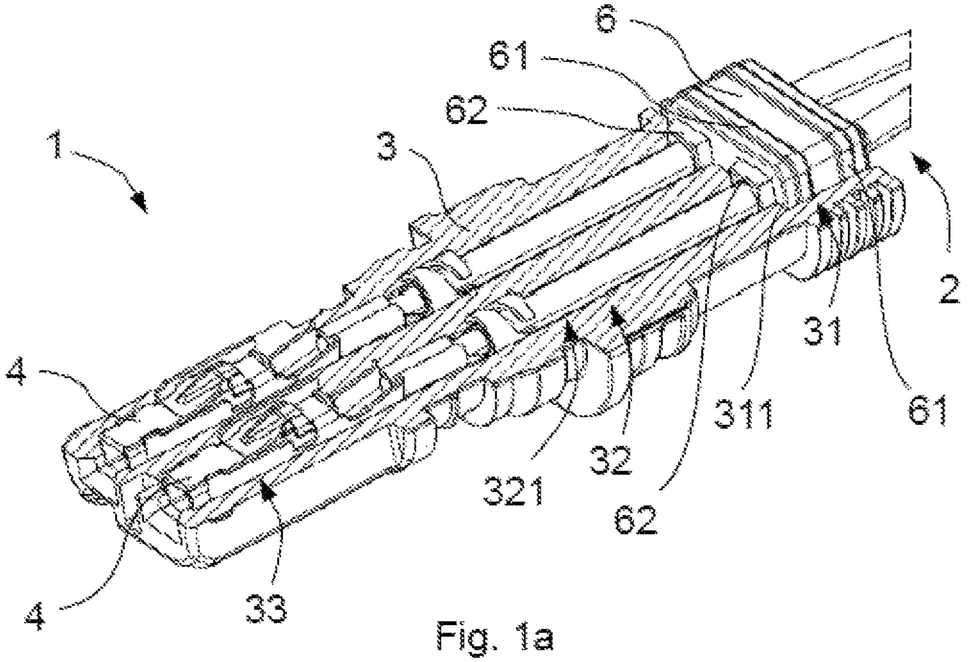
FIG. 1*a* shows a perspective view of a connector with a connected multi-core cable, a connector housing and contact elements.

The figures are diagrammatic examples. Identical reference numerals in the figures indicate identical functional and/or structural features.

Figure 1B:
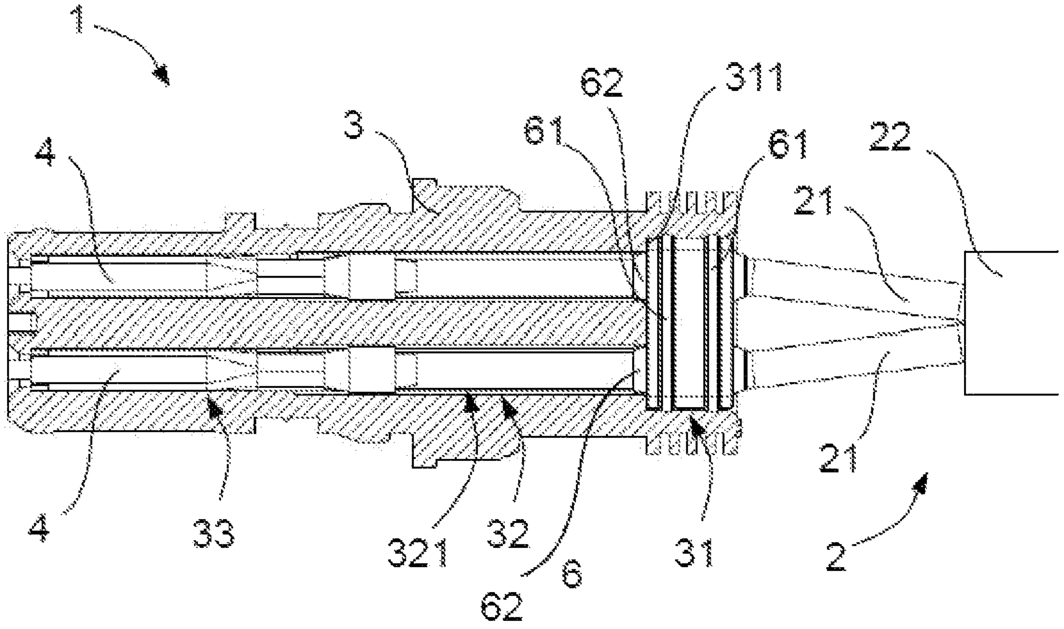
FIG. 1*b* shows a sectional view of the connector with a connected multi-core cable, a connector housing and contact elements.

FIGS. 1*a* and 1*b* show a perspective view (FIG. 1*a*) and a sectional view (1*b*) of a connector 1 with a connected multi-core cable 2, a connector housing 3 and contact elements 4.

The multi-core cable 2 is a sheathed cable and has at least two individual cores 21 surrounded by a cable sheath 22. A receiving space 31 is formed in the connector housing 3 at a longitudinal end, and the individual cores 21 are introduced into the connector housing 3 through the receiving space 31 and then run through a cable guide portion 32.

The contact elements 4 are abutted against a respective end of the individual cores 21 at the end of the cable guide portion 32 and are mounted in a contact chamber 33 of the connector housing 3 with a floating clearance. Further, a sealing element 6 is arranged in the receiving space 31 and the sealing element 6 abuts against a stop 311 of the receiving space 31.

Moreover, the respective individual core 21 is guided in the cable guide portion 32 between the sealing element 6 and the contact element 4 with a lateral clearance and/or a bearing gap 321 to the inner wall of the cable guide portion 32, thus realizing the bearing clearance of the corresponding contact element 4.

Further, a sealing sheath 5 is provided which extends at least from the longitudinal end and/or from the receiving space 31 to the cable sheath 22.

A length of the respective individual core in the cable guide portion 32 corresponds to about 80% of the contact length in the contact chamber 33.

Moreover, the respective individual core 21 is passed individually through a sealing recess 60 of the sealing element 6. The sealing element 6 has two ribs 61 running along the entire circumference and extending in a transverse direction of the connector 1. Further, a diameter of a base body of the sealing element 6 is constant in a longitudinal direction of the connector 1.

Figure 2:
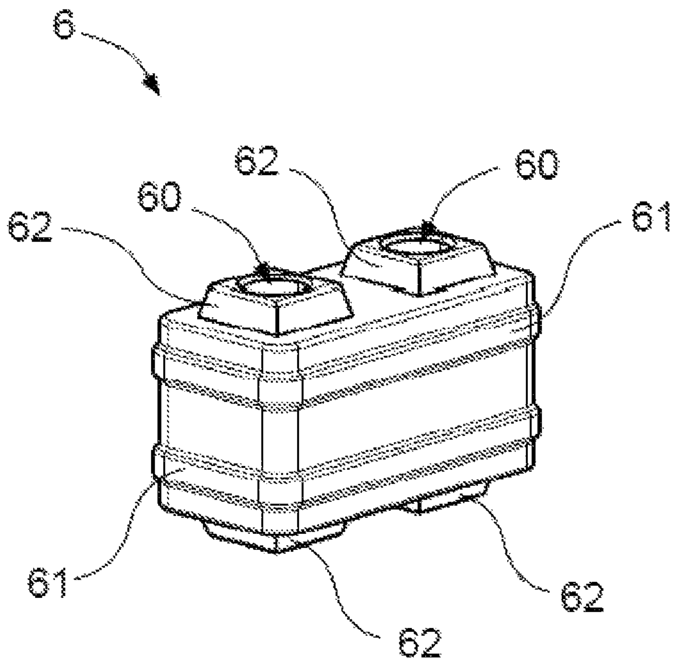
FIG. 2 shows a perspective view of a sealing element.

FIG. 2 shows a perspective view of a sealing element 6. The sealing element 6 has two ribs 61 running along the entire circumference and extending in a transverse direction of the connector 1. Furthermore, the ribs 61 are arranged in an edge region of the sealing element 6. The sealing element 6 comprises a projection 62 at a respective inlet and an outlet for the corresponding individual core 21. Further, the sealing element is substantially cuboidal and a diameter of a base body of the sealing element 6 is constant in a longitudinal direction. The respective individual core 21 is able to be passed individually through a sealing recess 60 of the sealing element 6.

Figure 3:
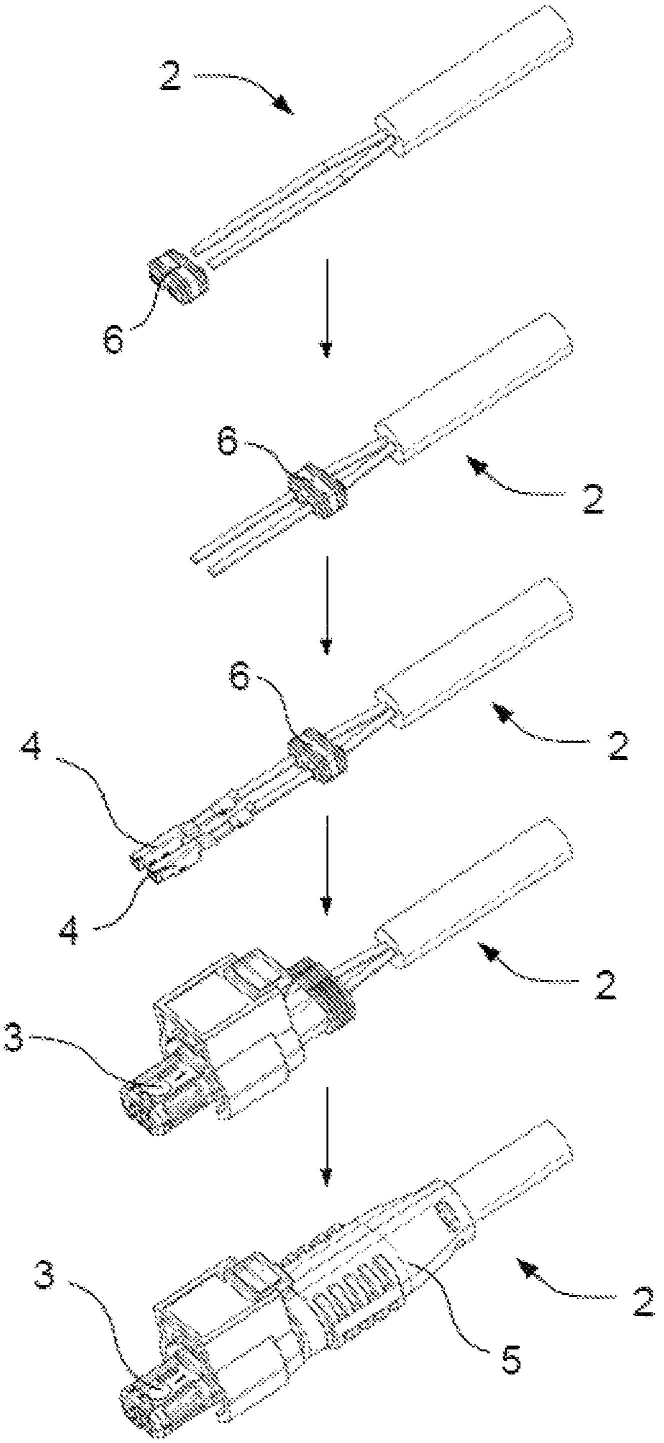
FIG. 3 shows a schematic view of a sequence of the steps of a method of assembling the connector.

FIG. 3 is a schematic view of a sequence of the steps of a method of assembling the connector 1 shown in FIGS. 1*a* and 1*b*.

First, the multi-core cable 2 is at least partially untwisted and/or stripped and/or straightened before assembly of the sealing element 6. Then, the sealing element 6 is assembled to individual cores 21 of the multi-core cable 2. During assembly, the respective individual core 21 is passed individually through a sealing recess 60 of the sealing element 6. Then, contact elements 4 are abutted against a respective end of the individual cores 21. Subsequently, the contact elements 4 and the individual cores 21 are introduced into a receiving space 31 of the connector housing 3 of the connector (1) until the sealing element 6 abuts against a stop 311 of the receiving space 31 and the individual cores 21 run through a cable guide portion 32 and the contact elements 4 are mounted in a contact chamber 33 of the connector housing 3 with a floating clearance.

As such, the respective individual core 21 is guided in the cable guide portion 32 between the sealing element 6 and the contact element 4 with a lateral clearance and a bearing gap 321 to the inner wall of the cable guide portion 32, thus realizing the bearing clearance of the corresponding contact element 4.

After introduction, the connector housing 3 and the multi-core cable 2 are overmolded with a sealing sheath 5 at least in a region from the receiving space 31 to a cable sheath 22 of the multi-core cable 2.

The practice of the disclosure is not limited to the preferred exemplary embodiments set forth above. Instead, a number of variants may be contemplated which make use of the solution shown even in case of basically different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connector with a connected multi-core cable, a connector housing and contact elements, wherein the multi-core cable has at least two individual cores surrounded by a cable sheath, wherein a receiving space is formed in the connector housing at a longitudinal end, and the individual cores are introduced into the connector housing through the receiving space and then run through a cable guide portion, wherein the contact elements are abutted against a respective end of the individual cores at the end of the cable guide portion and are mounted in a contact chamber of the connector housing with a floating clearance, wherein a sealing element is arranged in the receiving space and the sealing element abuts against a stop of the receiving space, wherein the respective individual core is guided in the cable guide portion between the sealing element and the contact element with a lateral clearance and/or a bearing gap to the inner wall of the cable guide portion, thus realizing the bearing clearance of the corresponding contact element.

2. The connector according to claim 1, wherein a sealing sheath is further provided which extends at least from the longitudinal end/from the receiving space to the cable sheath.

3. The connector according to claim 1, wherein a length of the respective individual core in the cable guide portion corresponds to at least about 80% of the contact length in the contact chamber, preferably 80% to 300%, more preferably 80% to 150%.

4. The connector according to claim 1, wherein the respective individual core is passed individually through the sealing element, in particular through a sealing recess.

5. The connector according to claim 1, wherein the sealing element has at least two ribs, in particular running along the entire circumference, which extend in particular in a transverse direction of the connector wherein the ribs are arranged in an edge region of the sealing element.

6. The connector according to claim 1, wherein the sealing element has a projection at a respective inlet and an outlet for the corresponding individual core.

7. The connector according to claim 1, wherein a diameter of a base body of the sealing element is constant in a longitudinal direction of the connector.

8. The connector according to claim 1, wherein the sealing element is designed to be substantially cuboidal.

9. The connector according to claim 1, wherein the multi-core cable is a sheathed cable or a cable with individual cores and the cable sheath, in particular a hose or pipe, arranged movably around the individual cores.

10. A method of assembling the connector with the multi-core cable, in particular according to claim 1, comprising the steps of:

a. assembling the sealing element to individual cores of the multi-core cable, b. abutting the contact elements against a respective end of the individual cores, C. introducing the contact elements and the individual cores into the receiving space of the connector housing of the connector until the sealing element abuts against a stop of the receiving space and the individual cores run through the cable guide portion and the contact elements are mounted in a contact chamber of the connector housing with a floating clearance, wherein the respective individual core is guided in the cable guide portion between the sealing element and the contact element with a lateral clearance and/or a bearing gap to the inner wall of the cable guide portion, thus realizing the bearing clearance of the corresponding contact element.

11. The method according to claim 10, wherein, during assembly, the respective individual core is passed individually through the sealing element, in particular through the sealing recess of the sealing element.

12. The method according to claim 10, wherein, after introduction, the connector housing and the multi-core cable are overmolded with the sealing sheath at least in a region from the receiving space to the cable sheath of the multi-core cable.

* * * * *